US012586514B2

(12) United States Patent
Li et al.

(10) Patent No.: US 12,586,514 B2
(45) Date of Patent: Mar. 24, 2026

(54) SPLICED DISPLAY SCREEN AND SPLICED DISPLAY DEVICE

(71) Applicant: SHENZHEN CHINA STAR OPTOELECTRONICS SEMICONDUCTOR DISPLAY TECHNOLOGY CO., LTD., Shenzhen (CN)

(72) Inventors: Zhuhui Li, Shenzhen (CN); Yanfen Li, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 39 days.

(21) Appl. No.: 18/527,312

(22) Filed: Dec. 3, 2023

(65) Prior Publication Data

US 2025/0046231 A1 Feb. 6, 2025

(30) Foreign Application Priority Data

Jul. 31, 2023 (CN) ......................... 202310957160.4

(51) Int. Cl.
*G09G 3/32* (2016.01)

(52) U.S. Cl.
CPC ....... *G09G 3/32* (2013.01); *G09G 2300/0408* (2013.01); *G09G 2300/0452* (2013.01); *G09G 2300/0804* (2013.01); *G09G 2310/0221* (2013.01)

(58) Field of Classification Search
CPC .............................................. G09G 2300/0408
See application file for complete search history.

(56) References Cited

U.S. PATENT DOCUMENTS

| | | | | |
|---|---|---|---|---|
| 12,001,748 | B1 * | 6/2024 | Chen | G06F 3/147 |
| 2017/0154596 | A1 * | 6/2017 | Nishiyama | G02F 1/1345 |
| 2020/0402475 | A1 * | 12/2020 | Li | G09G 3/3677 |
| 2021/0217353 | A1 * | 7/2021 | Zhao | H01L 25/0753 |
| 2022/0045120 | A1 * | 2/2022 | Liu | H10H 20/857 |
| 2022/0052022 | A1 * | 2/2022 | Yu | H01L 24/33 |
| 2023/0246038 | A1 * | 8/2023 | Lou | H01L 27/124 257/88 |
| 2023/0307489 | A1 * | 9/2023 | Lou | H10H 29/142 |
| 2024/0014194 | A1 * | 1/2024 | Jiang | H01L 25/167 |
| 2024/0112625 | A1 * | 4/2024 | Sang | H01L 25/167 |

* cited by examiner

*Primary Examiner* — Bipin Gyawali
(74) *Attorney, Agent, or Firm* — The Roy Gross Law Firm, LLC; Roy D. Gross

(57) ABSTRACT

A spliced display screen and a spliced display device are provided. The spliced display screen includes gate driving units arranged within pixel units to drive these pixel units, eliminating the need for binding scan chips. This approach can reduce the number of side wirings and binding terminals, thereby improving the yield of the spliced display screen. Additionally, by placing both scan terminals and data terminals on the same side of the display area, the display panel is designed with connecting terminals on only one side, effectively eliminating a border on one side of a display panel. Moreover, a terminal area of one display panel is arranged corresponding to the display area of another display panel, and therefore, a splicing seam is minimized or even eliminated.

14 Claims, 4 Drawing Sheets

US 12,586,514 B2

SPLICED DISPLAY SCREEN AND SPLICED DISPLAY DEVICE

CROSS-REFERENCE TO RELATED APPLICATION

This application claims the benefit of priority of Chinese Patent Application No. 202310957160.4, filed on Jul. 31, 2023, the disclosure of which is incorporated herein by reference in its entirety.

FIELD OF DISCLOSURE

The present application relates to a field of display technology and in particular, to a spliced display screen and a spliced display device.

DESCRIPTION OF RELATED ART

Micro light-emitting diode (Micro-LED) display devices are widely used due to their advantages of self-illumination, high brightness, high contrast, high resolution and color saturation, long life, fast response speed, and low power consumption. To achieve large-screen displays, existing display devices often splice multiple Micro-LED display devices together. In these spliced display devices, to achieve a seamless appearance, existing devices typically route front signals to the back of a display area through side wirings, aiming for seamless splicing. However, this method requires setting connecting terminals on the top and bottom sides of the display panel. This leads to an issue where the width of terminal areas at splicing joints becomes too large, preventing the realization of a seamless spliced display.

As shown in FIG. 1, a Micro-LED display device consists of multiple spliced Micro-LED display panels 1. Each Micro-LED display panel 1 includes multiple pixels 11 arranged in an array and a driving circuit for driving these pixels 11. The driving circuit is designed to set connecting terminals on both sides of the Micro-LED display panel 1 to conduct front signals to the back, thereby connecting to a driving chip, which minimizes the frame/border. From FIG. 1, it can be seen that the pixels 11 include red sub-pixels 111, green sub-pixels 112, and blue sub-pixels 113. The driving circuit includes scan lines 14 and data lines 15. The connecting terminals include gate connecting terminals 12 and data connecting terminals 13. Since the gate connecting terminals 12 are bonded to a gate driving chip, and the data connecting terminals 13 are bonded to a data driving chip, the gate connecting terminals 12 and the data connecting terminals 13 are respectively placed on the top side and the bottom side of the display panel (they are not set on adjacent sides due to manufacturing process and electrical signal limitations, which could cause interference between terminals at the junction of adjacent sides). Specifically, the scan line 14 includes a horizontal part 142 and a vertical part 141. The horizontal part 142 connects a row of pixels, the vertical part 141 passes through a via to connect with the horizontal part 142, and the vertical part 141 connects to the gate connecting terminal 12. The data line 15 connects a column of pixels and connects to the data connecting terminal 13. However, this leads to a larger border on the Micro-LED display panel 1. When splicing two Micro-LED display panels 1, there exist two terminal areas between them, resulting in a larger gap at the joint of the two Micro-LED display panels 1, which can cause issues like dark lines in the spliced display device during display. Additionally, due to the limitations of cutting and splicing processes, there is a certain gap between two Micro-LED display panels 1, further increasing the seam size. Therefore, existing spliced display devices have a technical problem of needing to set the connecting terminals on both the top side and the bottom side of the display panel, leading to larger seams in the spliced display devices.

Therefore, existing spliced display devices face a technical challenge where connecting terminals must be set on the top and bottom sides of the display panel, leading to larger seams in the spliced display devices.

SUMMARY OF INVENTION

The embodiments of this application provide a spliced display screen and a spliced display device to alleviate this technical issue of existing spliced display devices, which need connecting terminals on the top and bottom sides of a display panel, resulting in larger splicing seams in the spliced display devices.

The present application provides a spliced display screen, including:

at least two spliced display panels, wherein each of the display panels includes a terminal area and a display area, the terminal area is disposed on one side of the display area, the display area includes a plurality of pixel units, and the pixel units include a plurality of sub-pixel units and a plurality of gate driving units;

wherein the terminal area includes a plurality of data terminals and a plurality of scan terminals, the data terminals are connected to the sub-pixel units, the scan terminals are connected to the gate driving units, the data terminals and the scan terminals are disposed on a same side of the display area, the terminal area of one of the display panels is arranged corresponding to the display area of another one of the display panels.

In some embodiments, for each of the display panels, the pixel units are arranged in an array in the display area, and in each row of the pixel units, the sub-pixel units are disposed between the adjacent gate driving units within each two neighboring pixel units.

In some embodiments, for each of the display panels, in each two neighboring pixel units in each column of the pixel units, adjacent gate driving units are disposed on a same side of the sub-pixel units.

In some embodiments, each of the sub-pixel units includes a red sub-pixel unit, a green sub-pixel unit, and a blue sub-pixel unit, and wherein the red sub-pixel unit, the green sub-pixel unit, and the blue sub-pixel unit are arranged between the adjacent gate driving units in each row of the sub-pixel units.

In some embodiments, the gate driving units include a plurality of pull-up control units, a plurality of first pull-down maintaining units, a plurality of second pull-down maintaining units, a plurality of pull-up units, and a plurality of pull-down units; and the pull-up control units, the first pull-down maintaining units, the second pull-down maintaining units, the pull-up units, and the pull-down units are respectively arranged in the pixel units.

In some embodiments, for each of the display panels, the pixel units are arranged in an array in the display area, and in one row of the pixel units, some of the pixel units include the gate driving units, some of the pixel units exclude the gate driving units, and the pixel units provided with the gate driving units are arranged adjacently.

In some embodiments, at a splicing joint of two neighboring ones of the display panels, a distance from a row of the pixel units in one display panel closest to the terminal area at the splicing joint to a row of the pixel units in the other display panel closest to the terminal area at the splicing joint ranges from 0.9 to 1.1 times a distance between each two adjacent pixel units in any of the two neighboring display panels.

In some embodiments, in each of the display panels, the data terminals and the scan terminals are disposed in a same row, and the scan terminals and the gate driving units are disposed on a same side of the data terminals.

In some embodiments, in each of the display panels, the data terminals and the scan terminals are disposed in different rows, and the scan terminals are disposed on one side of the data terminals away from the pixel units.

Furthermore, the present application provides a spliced display device. The spliced display device includes any of the spliced display screens mentioned above.

Beneficial Effects: This application provides a spliced display screen and a spliced display device. The spliced display panel includes at least two spliced display panels. Each display panel includes a terminal area and a display area, with the terminal area located on one side of the display area. The display area is provided with pixel units. The pixel units include multiple sub-pixel units and multiple gate driving units. The terminal area is provided with data terminals and scan terminals. The data terminals are connected to the sub-pixel units, and the scan terminals are connected to the gate driving units. Both the data terminals and the scan terminals are located on the same side of the display area, and the terminal area of one display panel is arranged corresponding to the display area of another display panel. This application, by integrating the gate driving units within the pixel units and using these gate driving units to drive the pixel units, eliminates the need for binding scan chips. This approach can reduce the number of side wirings and bonding terminals, thus improving the yield of the spliced display screens. Additionally, by placing the scan terminals and the data terminals on the same side of the display area, the display panel has connecting terminals set on only one side, effectively eliminating the border/frame on one side of the display panel. Furthermore, the terminal area of one display panel is arranged corresponding to the display area of another display panel, reducing or even eliminating the seam.

BRIEF DESCRIPTION OF DRAWINGS

The technical solutions and other beneficial effects of the present application will be apparent through a detailed description of the specific embodiments of the present application in connection with the accompanying drawings.

DETAILED DESCRIPTION OF EMBODIMENTS

Figure 1:
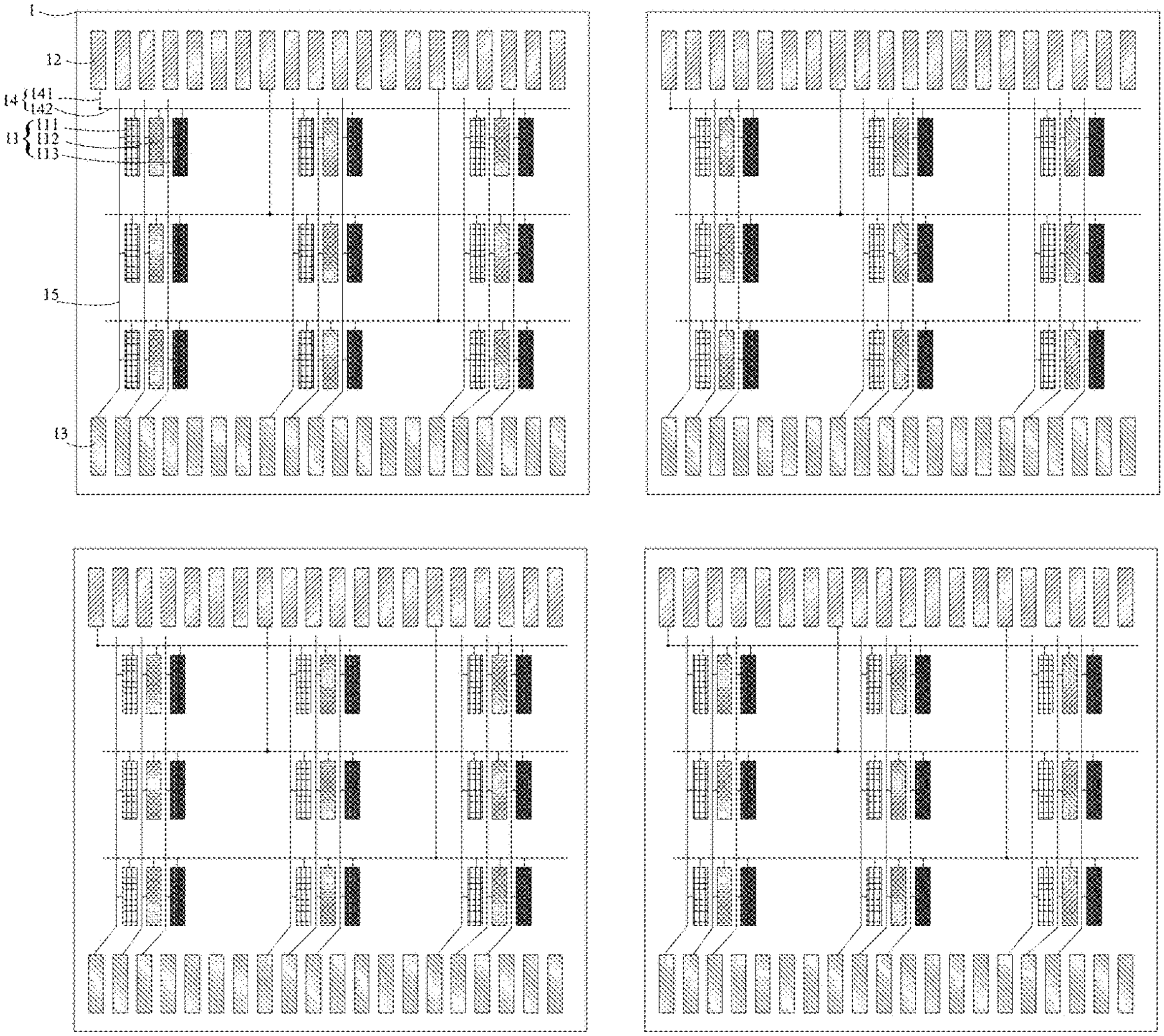
FIG. 1 Prior Art
FIG. 1 is a schematic view of a conventional spliced display device.

In the following, the technical scheme in the embodiments of this application is clearly and completely described in conjunction with the accompanying drawings of the embodiments. It is obvious that the embodiments described are just part of the embodiments of this application, not all embodiments. Based on the embodiments in this application, all other embodiments obtained by those skilled in the art without creative efforts fall within the scope protection of this application.

In the description of this application, it should be understood that the terms "center," "longitudinal," "transverse," "length," "width," "thickness," "top," "bottom," "front," "rear," "left," "right," "vertical," "horizontal," "top," "bottom," "inside," "outside," "clockwise," "counterclockwise," etc., indicate the orientation or positional relationship based on the orientations or positional relationships shown in the drawings, which are only for the convenience of describing this application and simplifying the description, and do not indicate or imply that the device or element referred must have a specific orientation, be constructed and operated in a specific orientation, and thus should not be considered as limiting this application. Moreover, the terms "first," "second," etc., are used for descriptive purposes only and should not be construed as indicating or implying relative importance or implicitly indicating the number of technical features indicated. Thus, a feature limited by "first," "second," may explicitly or implicitly include one or more of such features. In this application's description, "multiple" means two or more, unless otherwise explicitly and specifically defined.

In the description of this application, it should be noted that unless otherwise explicitly specified and limited, the terms "mounted," "connected," "coupled" should be broadly understood, for example, it can be a fixed connection, or a detachable connection, or integrally connected; it can be a mechanical connection, or electrical connection or can communicate with each other; it can be directly connected, or indirectly connected through an intermediary, or the internal communication of two elements or the interaction between two elements. For those skilled in the art, the above terms in this application can be understood according to specific situations.

In this application, unless otherwise explicitly specified and limited, a first feature "above" or "below" a second feature can include the first and second features being in direct contact, or the first and second features not being in direct contact but instead being in contact through another feature between them. Moreover, the first feature "over," "above," and "on" the second feature include the first feature being directly above and obliquely above the second feature, or simply indicating that the first feature is higher than the second feature in terms of horizontal height. The first feature "below," "under," and "beneath" the second feature include the first feature being directly below and obliquely below the second feature, or simply indicating that the first feature is lower than the second feature in terms of horizontal height.

The following disclosure provides many different embodiments or examples for realizing different structures of this application. To simplify the disclosure of this application, specific components and settings of particular examples are described in the following text. Of course, they are merely examples, and their purpose is not to limit this application. Furthermore, this application may repeat reference numbers and/or letters in different examples, such repetition is for simplification and clarity and does not indicate the relationship between the various embodiments and/or settings discussed. In addition, this application provides examples of various specific processes and materials, but those skilled in the art may realize the application of other processes and/or the use of other materials.

The embodiments of this application provide a spliced display screen and a spliced display device to alleviate the aforementioned technical problems.

Figure 2:
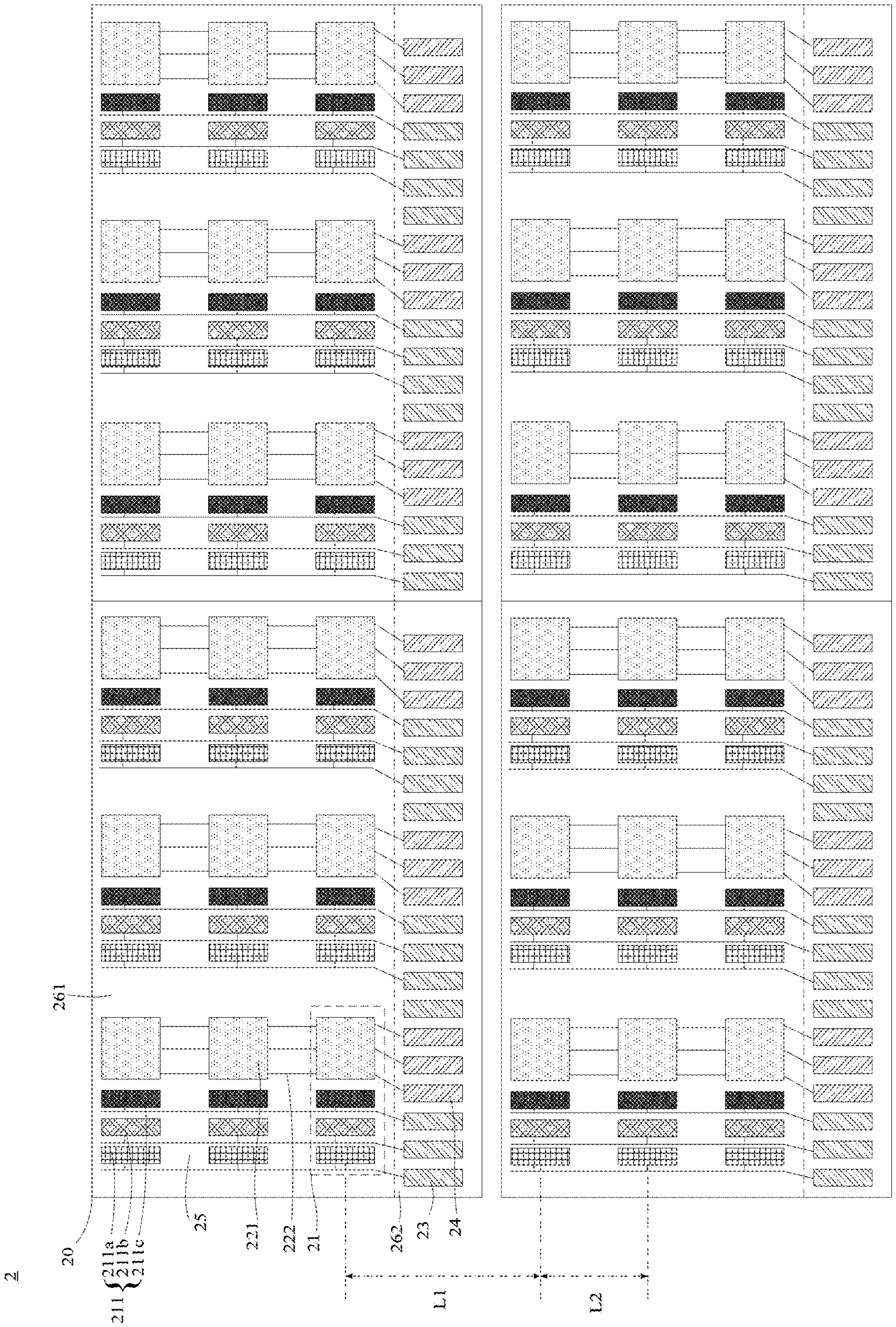
FIG. 2 is a schematic view of a spliced display screen provided by one embodiment of the present application.

As shown in FIG. 2, the embodiments of this application provide a spliced display screen. This spliced display screen 2 includes at least two spliced display panels 20. The display panel 20 includes a terminal area 262 and a display area 261. The terminal area 262 is arranged on one side of the display area 261, and the display area is provided with pixel units 21. The pixel units 21 include multiple sub-pixel units 211 and multiple gate driving units 221.

The terminal area 262 is provided with data terminals 23 and scan terminals 24. The data terminals 23 are connected to the sub-pixel units 211, and the scan terminals 24 are connected to the gate driving units 221. The data terminals 23 and the scan terminals 24 are located on the same side of the display area 261. The terminal area 262 of one display panel 20 is arranged corresponding to the display area 261 of another display panel 20.

The embodiments of this application provide a spliced display screen. The spliced display screen includes gate driving units arranged within the pixel units. Using the gate driving units to drive pixel units eliminates the need for binding scan chips. Accordingly, this can reduce the number of side wirings and binding terminals, improve the yield of the spliced display screen. By placing scan terminals and data terminals on the same side of a display area, connecting terminals are only set on one side of a display panel, thereby eliminating a border on one side of the display panel. Furthermore, a terminal area of one display panel is arranged corresponding to the display area of another display panel, thus minimizing or even eliminating a splicing seam.

Specifically, compared to the current design of spliced display devices, the embodiments of this application reduce side wires and connection terminals by adopting gate driving units instead of the original gate driving chip design. This eliminates the border/frame on one side of the display panel, improves the yield of the display panels, and compared to setting the gate driving units on both sides of the display area of the display panel, this application sets the gate driving units inside the pixel units. This does not increase the border/frame on both sides of the display panel, compared to the current design of display devices. The application does not increase the border/frame on both sides of the display panel but can eliminate the border/frame on one side of the display panel. Setting the terminal area of one display panel corresponding to the display area of another display panel makes the splicing seam between adjacent display panels smaller, thus reducing or even eliminating the splicing seam.

Specifically, multiple gate driving units form a gate driving circuit. The gate driving circuit can realize individual control of each scan line through cascade signal transmission. The gate driving circuit only needs to connect to the terminals that input signals. Therefore, compared to connecting a gate connecting terminal to one scan line to achieve individual control of each scan line, the gate driving circuit can reduce the number of terminals and achieve individual control of each scan line.

Specifically, the gate driving units are connected to scan lines, and the scan lines are connected to a row of the sub-pixel units, and signals are output to the scan lines through the gate driving units.

Specifically, data terminals and scan terminals refer to terminals that respectively transmit data signals and control signals of the gate driving units. The data terminals and the scan terminals are respectively connected to side wires.

Specifically, as shown in FIG. 2, the sub-pixel units 211 are connected to the data terminals 23, which means the sub-pixel units 211 are connected to data lines 25, and the data lines 25 connect the sub-pixel units 211 and the data terminals 23.

Specifically, as shown in FIG. 2, the gate driving units 221 are connected to the scan terminals 24, which means the gate driving units 221 are connected to the scan terminals 24 through connecting lines 222.

Specifically, as shown in FIG. 2, the connecting line 222 connects a column of the gate driving units. However, it should be understood that this is just illustrative. If a column of the gate driving units forms a gate driving circuit, then the connecting line 222 can connect a column of the gate driving units. If a column of the gate driving units is part of multiple gate driving circuits, then the connecting line 222 may not connect each gate driving unit in the column.

In some embodiments, as shown in FIG. 2, the pixel units 21 are arranged in an array in the display area 261. In each row of the pixel units 21, the sub-pixel units 211 are placed between adjacent gate driving units 221 of two neighboring pixel units. By arranging the sub-pixel units between adjacent gate driving units within neighboring pixel units, the arrangement of the sub-pixel units and the gate driving unit in each pixel unit is the same. During display, the display effect of each pixel unit is similar or even identical, improving the display effect.

Specifically, the above embodiments illustrate the sub-pixel units placed between the gate driving units. However, this application is not limited to this configuration. For example, in a row of the pixel units, the sub-pixel units may not be set between the gate driving units. For instance, one gate driving unit could be placed on the right side of a sub-pixel unit, while another gate driving unit could be placed on the left side of another sub-pixel unit.

In some embodiments, as shown in FIG. 2, in each column of the pixel units 21, adjacent gate driving units 221 are placed on the same side of the sub-pixel units 211. By arranging adjacent gate driving units on the same side of the sub-pixel units in a column of the pixel units, the arrangement of the sub-pixel units 211 and the gate driving unit 221 within each pixel unit is the same. During display, the display effect of each pixel unit is similar or even identical, improving the display effect.

Specifically, the above embodiments illustrate the sub-pixel units placed between the gate driving units. However, this application is not limited to this configuration. For example, in a column of the pixel units, the gate driving units can be placed on both sides of the sub-pixel units, such as one gate driving unit on the right side of a sub-pixel unit and another gate driving unit on the left side of the sub-pixel unit.

In some embodiments, as shown in FIG. 2, the sub-pixel units 211 include red sub-pixel units 211*a*, green sub-pixel units 211*b*, and blue sub-pixel units 211*c*. The red, green, and blue sub-pixel units 211*a*, 211*b*, 211*c* are placed between adjacent gate driving units 221. By placing the red, green, and blue sub-pixel units 211*a*, 211*b*, 211*c* between adjacent gate driving units, the gate driving units are arranged on one side of the sub-pixel units, avoiding interference with the design of the sub-pixel units. This arrangement allows the sub-pixel units to function normally. In addition, by arranging the sub-pixel units within the pixel units, the border/frame on one side is eliminated for seamless splicing.

Specifically, the above embodiments illustrate the sub-pixel units including red, green, and blue sub-pixel units.

However, this application is not limited in this regard. For example, the sub-pixel units can include red, green, blue, and white sub-pixel units.

Specifically, as shown in FIG. 2, the red, green, and blue sub-pixel units are arranged in the same row for illustration. However, this application is not limited to this configuration. For instance, if adjacent pixel units share a sub-pixel unit, red, green, and blue sub-pixel units within a pixel unit can be arranged across multiple rows.

Specifically, the above embodiments illustrate the gate driving units arranged on one side of the sub-pixel units. However, this application is not limited in this regard. The gate driving units can be placed between the sub-pixel units. For example, in one pixel unit, the gate driving unit can be placed between the red and green sub-pixels, or between the green and blue sub-pixels.

Specifically, the above embodiments illustrate the pixel units with the gate driving units designed similarly. However, this application is not limited to this. For example, the design of some pixel units with the gate driving units can be different.

Figure 3:
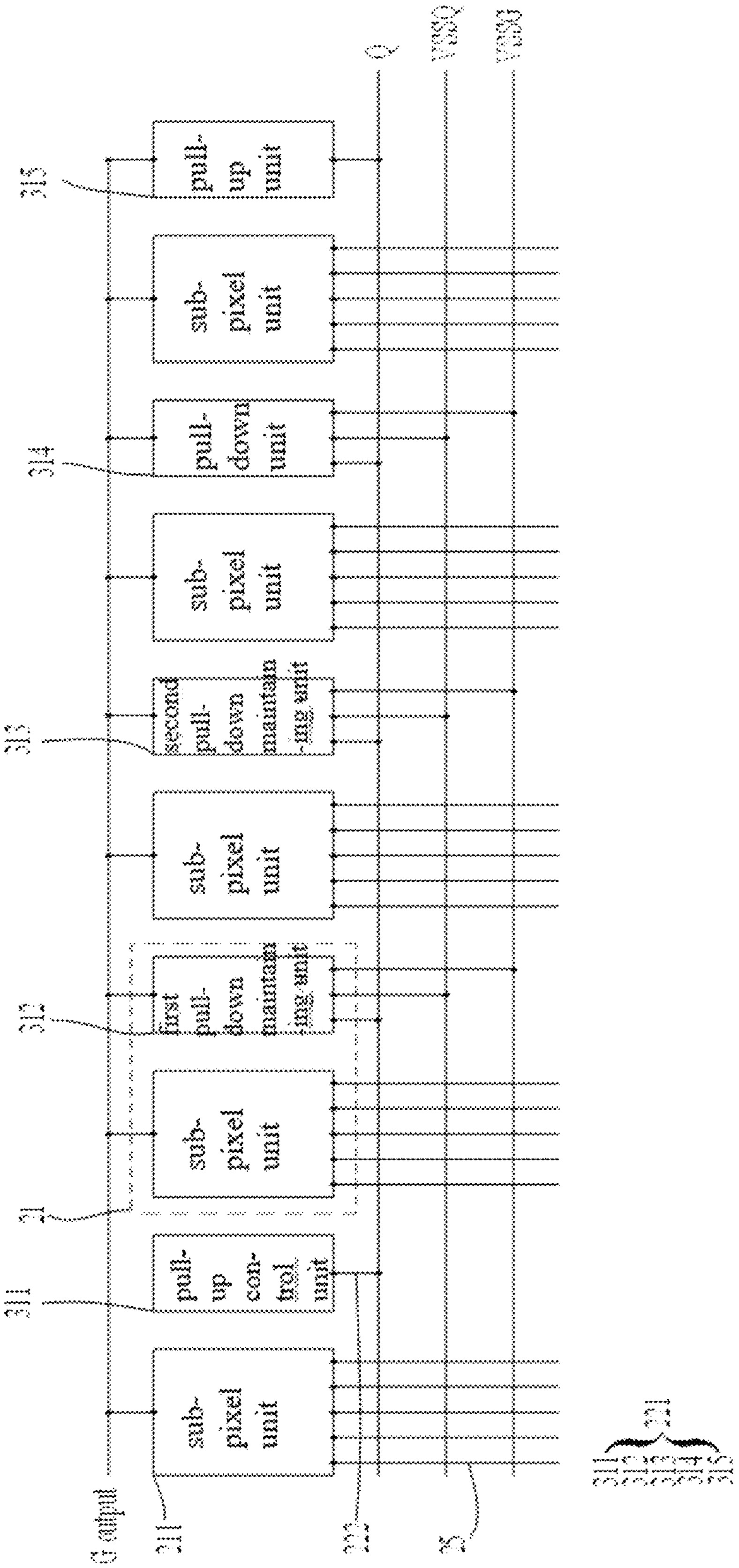
FIG. 3 is a first schematic view of a display panel provided by one embodiment of the present application.

In some embodiments, as shown in FIGS. 2 and 3, the gate driving units 221 includes a pull-up control unit 311, a first pull-down maintaining unit 312, a second pull-down maintaining unit 313, a pull-up unit 315, and a pull-down unit 314. The pull-up control unit 311, the first pull-down maintaining unit 312, the second pull-down maintaining unit 313, the pull-up unit 315, and the pull-down unit 314 are respectively arranged within multiple pixel units 21. By placing the gate driving units in the respective pixel units, the space occupied by the gate driving unit within each pixel unit is minimized, thus not affecting the normal display of the pixel units and preventing issues such as dark lines between adjacent pixel units, thereby improving the display effect.

Specifically, taking a row of the pixel units 21 in FIG. 3 as an example, the pull-up control unit 311 is placed in the first pixel unit 21, the first pull-down maintaining unit 312 in the second pixel unit 21, the second pull-down maintaining unit 313 in the third pixel unit 21, the pull-down unit 314 in the fourth pixel unit 21, and the pull-up unit 315 in the fifth pixel unit 21. This arrangement ensures that the size of each pixel unit is similar or even identical, resulting in a similar or identical display effect for each pixel unit, without issues like dark lines between the pixel units 21, thus enhancing the display quality.

It should be understood that an area occupied by each gate driving unit might vary. For example, the first pull-down maintaining unit might include multiple transistors, while the pull-up control unit might include only one transistor, resulting in different space requirements. Therefore, multiple smaller gate driving units can be placed in one pixel unit, and a larger gate driving unit can be placed in another pixel unit, making the area of each pixel unit similar or even identical. Also, multiple transistors within one gate driving unit can be distributed across multiple pixel units, reducing an area of each pixel unit and increasing the resolution.

As shown in FIGS. 2 and 3, the connecting lines 222 can include wiring connected to a point Q (a node for inputting the scan signal to the pull-up unit, marked as Q in FIG. 3), a first low potential line VSSQ, and a second low potential line VSSG. Alternatively, the connecting lines 222 may not include the aforementioned wiring. From FIGS. 2 and 3, it can be seen that the pull-up control unit 311 can be connected to the point Q, the first pull-down maintaining unit 312 can be connected to the point Q, the first low potential line VSSQ, the second low potential line VSSG, and the scan signal output end marked as G output. The second pull-down maintaining unit 313 can be connected to the point Q, the first low potential line VSSQ, the second low potential line VSSG, and the scan signal output end G output. The pull-down unit 314 can be connected to the point Q, the first low potential line VSSQ, the second low potential line VSSG, and the scan signal output end G output. The pull-up unit 315 can be connected to the point Q and the scan signal output end G output. The sub-pixel units 211 can be connected to the scan signal output end G output. The specific configuration of the gate driving circuit is not repeatedly elaborated here.

Specifically, the above embodiments illustrate the arrangement where the pull-up control unit 311 is placed in the first pixel unit 21, the first pull-down maintaining unit 312 in the second pixel unit 21, the second pull-down maintaining unit 313 in the third pixel unit 21, the pull-down unit 314 in the fourth pixel unit 21, and the pull-up unit 315 in the fifth pixel unit 21 as an example. However, this application is not limited to this configuration. For instance, the pull-up control unit can be placed in the fifth pixel unit, and the first pull-down maintaining unit can be placed in in the first pixel unit. The arrangement of the gate driving units in one gate driving circuit can be set according to requirements, forming a gate driving circuit with a row of the gate driving units.

In some embodiments, as shown in FIG. 2, the pixel units 21 are arranged in an array in the display area 261. Within a row of the pixel units 21, some pixel units contain the gate driving units 221, while other pixel units do not contain the gate driving units 221 (not shown in the drawing). The pixel units containing the gate driving unit 221 are arranged adjacently. By arranging the pixel units with the gate driving units adjacently, a spacing between the gate driving units is minimized during connection of the gate driving units, preventing the impedance from being too high due to overly long wiring, and avoiding the need for multiple vias for conversion due to overly long wiring, thereby reducing the complexity of the display panel manufacturing process and improving the yield of the display panel.

Specifically, as the number of the gate driving units in one gate driving circuit is relatively small, these gate driving units might not be placed in all pixel units within a row but only in some of them. Thus, the pixel units containing the gate driving units can be continuously arranged, preventing overly long wiring, reducing impedance, and eliminating the need for multiple vias for conversion, thereby simplifying the display panel manufacturing process and improving the yield of the display panel.

In some embodiments, at a splicing joint of two adjacent display panels 20, a distance L1 between the row of the pixel units 21 closest to the terminal area 262 in one display panel 20 and the row of the pixel units 21 closest to the terminal area 262 in the other display panel 20 is 0.9 to 1.1 times a distance L2 between two adjacent pixel units 21 in one display panel 20, i.e., a range of L1/L2 is 0.9 to 1.1. By setting the distance between the closest rows of the pixel units at the splicing joint of two adjacent display panels to 0.9 to 1.1 times the distance between two adjacent pixel units, a width of the seam at the splicing joint of the spliced display panels is minimized. During display, the display effect of a single display panel is similar or even identical, and the splicing seam of the spliced display panels is smaller, thus avoiding display issues like dark lines at the seam, and achieving a seamless splicing display effect.

Specifically, in a single display panel, there is a certain distance between two adjacent rows of the pixel units. This application eliminates the border/frame on one side of the display panel and set the terminal area of one display panel at a position corresponding to the display area of another display panel. Thus, the seam at the splicing joint is the sum of a width of the terminal area of one display panel and a distance between the two display panels. Since the width of the terminal area and the distance between the two display panels are relatively small, the width of the seam is similar or even equal to the distance between adjacent pixel units. For example, the width of the seam is 0.9 to 1.1 times the distance between adjacent pixel units. During display, the display effect at the seam is similar or even identical to the display effect in the display area, thereby achieving a seamless splicing display effect.

Specifically, in FIG. 2, the distance between two pixel units is determined from a midpoint of one pixel unit to a midpoint of another pixel unit. However, this application is not limited to this. For example, a distance between a bottom of one pixel unit and a top of another pixel unit can be considered as the distance between two pixel units.

Specifically, at the splicing joint of two adjacent display panels 20, the distance between the row of the pixel units 21 closest to the terminal area 262 in one display panel 20 and the row of the pixel units 21 closest to the terminal area 262 in the other display panel 20 is equal to the distance between two adjacent pixel units 21 in one display panel 20. This makes the width of the seam at the splicing joint equal to the distance between adjacent pixels, effectively creating a seamless splicing display, as the display effect at the joint is the same as the display effect in the display area during display.

In some embodiments, as shown in FIG. 2, the data terminals 23 and the scan terminals 24 are located in the same row. The scan terminals 24 and the gate driving units 221 are on the same side of the data terminals 23. By placing the data terminals and the scan terminals in the same row, the width of the terminal area of the display panel is not increased, thus minimizing the seam in the spliced display screen and achieving a seamless splicing display effect as the display effect at the splicing joint is the same as the display effect in the display area.

Specifically, since the number of the scan terminals connected to the gate driving circuit is relatively small, the scan terminals and the data terminals can be placed in the same row, avoiding an increase in the width of the terminal area and thus minimizing the seam.

In some embodiments, the data terminal and the scan terminal are located on different rows. The scan terminals are on one side of the data terminals away from the pixel units. By placing the data and scan terminals on different rows, a distance between adjacent terminals can be increased, avoiding short circuits between adjacent terminals and improving the yield of the display panel.

Figure 4:
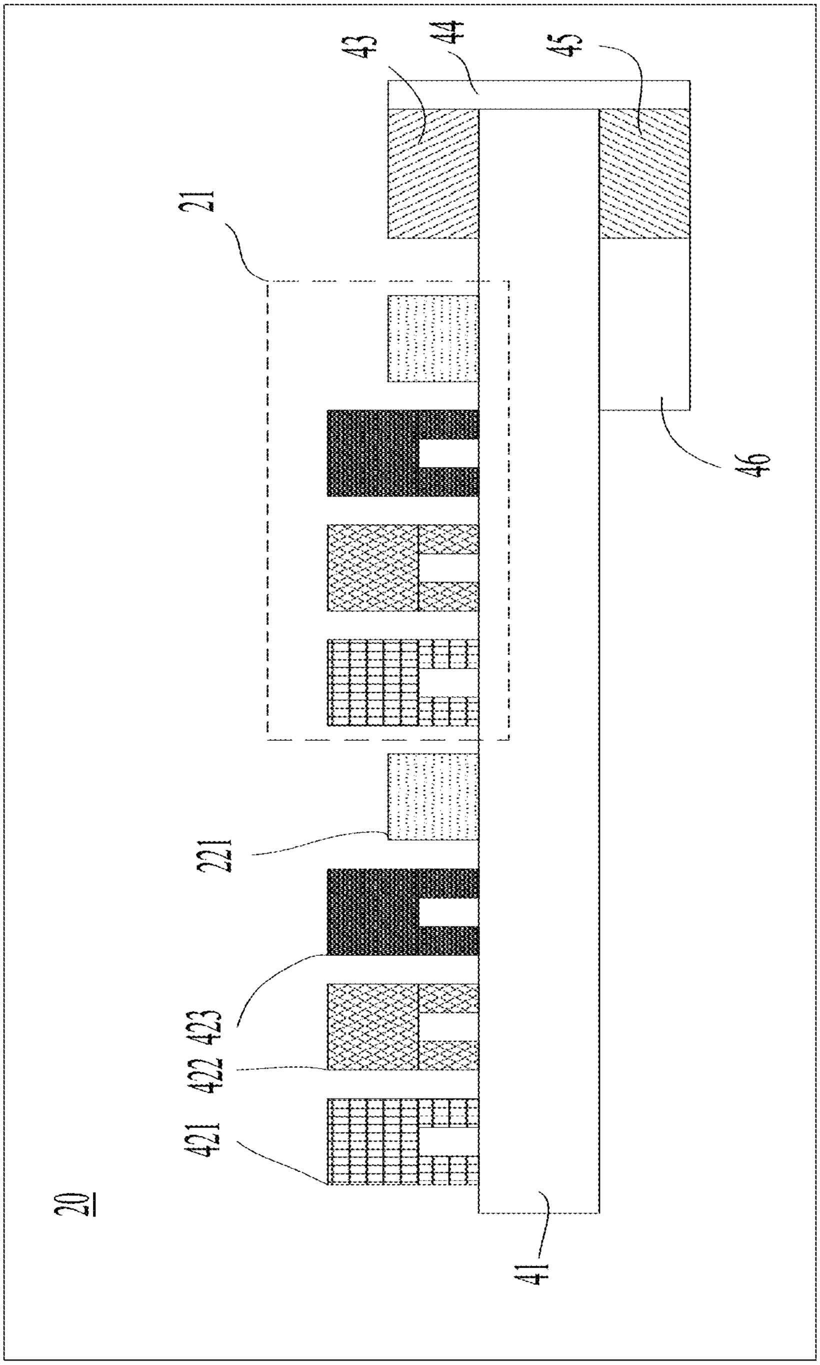
FIG. 4 is a second schematic view of the display panel provided by one embodiment of the present application.

In some embodiments, as shown in FIG. 4, the display panel 20 includes a backplate 41, red micro-LEDs 421, green micro-LEDs 422, blue micro-LEDs 423, front terminals 43, side wirings 44, back terminals 45, and a driver chip 46.

Specifically, the red sub-pixel unit includes the red micro-LED 421, the green sub-pixel unit includes the green micro-LED 422, and the blue sub-pixel unit includes the blue micro-LED 423. The front terminals 43 include the data terminals and the scan terminals.

Specifically, the display panel also includes a circuit board.

Specifically, to further reduce the space of the pixel units and improve a screen-to-body ratio, the display panel can use top-gate indium gallium zinc oxide semiconductor devices and copper line process technology to reduce a size of the thin-film transistors and a metal line width.

Specifically, the sub-pixel unit includes a thin-film transistor, a storage capacitor, and wiring.

Specifically, the above embodiments illustrate the spliced display screen from various aspects. It should be understood that, where the embodiments do not conflict, they can be combined. For example, in a row of the pixel units, the sub-pixel units are placed between adjacent gate driving units within adjacent pixel units, and in a column of the pixel units, adjacent gate driving units are respectively set on both sides of the sub-pixel units.

Additionally, this application provides a spliced display device which includes any of the spliced display screen as described in the aforementioned embodiments.

From the above embodiments, it can be understood that:

This application provides a spliced display screen and a spliced display device; the spliced display screen includes at least two spliced display panels. Each display panel includes a terminal area and a display area. The terminal area is located on one side of the display area. The display area is provided with pixel units which include multiple sub-pixel units and multiple gate driving units. The terminal area is provided with data terminals and scan terminals. The data terminals are connected to the sub-pixel units, and the scan terminals are connected to the gate driving units. The data terminals and the scan terminals are located on the same side of the display area. The terminal area of one display panel is arranged corresponding to the display area of another display panel. This application, by setting the gate driving units within the pixel units and using the gate driving units to drive the pixel units, eliminates the need for binding scan chips. This can reduce the number of side wirings and binding terminals, thus improving the yield of the spliced display panels. Additionally, by placing the scan terminals and the data terminals on the same side of the display area, the display panel has connecting terminals arranged on only one side, thereby eliminating the border/frame on one side of the display panel and setting the terminal area of one display panel at a position corresponding to the display area of another display panel, reducing or even eliminating the seam.

In the above embodiments, the description of each embodiment emphasizes different aspects. For parts not detailed in a certain embodiment, reference can be made to the relevant descriptions in other embodiments.

The above detailed introduction to the spliced display screen and the spliced display device of this application applies specific examples to explain the principles and implementation methods of this application. The descriptions of the above embodiments are only used to help understand the technical solution of this application and its core ideas. Those skilled in the art should understand that modifications can still be made to the technical solutions recorded in the foregoing embodiments, or some technical features can be equivalently replaced. Such modifications or replacements do not depart from the essence of the technical solutions of the embodiments of this application.

What is claimed is:

1. A spliced display screen, comprising:

at least two spliced display panels, wherein each of the display panels comprises a terminal area and a display area, the terminal area is disposed on one side of the display area, the display area comprises a plurality of pixel units, and the pixel units comprise a plurality of sub-pixel units and a plurality of gate driving units, wherein the gate driving units are located within the display area;

wherein the terminal area comprises a plurality of data terminals and a plurality of scan terminals, the data terminals are connected to the sub-pixel units, the scan terminals are connected to the gate driving units, the data terminals and the scan terminals are disposed on a same, single side of the display area, and the terminal area of one of the display panels is arranged corresponding to the display area of another one of the display panels, wherein for each of the display panels, the pixel units are arranged in an array in the display area, and in each row of the pixel units, the sub-pixel units are disposed between the adjacent gate driving units within each two neighboring pixel units, wherein for each of the display panels, the gate driving units are arranged in a plurality of columns in a column direction of the array of the pixel units, and each column of the gate driving units are arranged at intervals alongside a column of the sub-pixel units within a column of the pixel units, wherein each of the gate driving units is fully integrated within one of the pixel units, the gate driving units comprise a plurality of pull-up control units, a plurality of first pull-down maintaining units, a plurality of second pull-down maintaining units, a plurality of pull-up units, and a plurality of pull-down units; and the pull-up control units, the first pull-down maintaining units, the second pull-down maintaining units, the pull-up units, and the pull-down units are respectively arranged in the pixel units in each row, and wherein for each of the display panels, in a column of the pixel units, adjacent gate driving units are disposed on a same side of the sub-pixel units.

2. The spliced display screen according to claim 1, wherein for each of the display panels, in each two neighboring pixel units in each column of the pixel units, adjacent gate driving units are disposed on a same side of the sub-pixel units.

3. The spliced display screen according to claim 1, wherein each of the sub-pixel units comprises a red sub-pixel unit, a green sub-pixel unit, and a blue sub-pixel unit, and wherein the red sub-pixel unit, the green sub-pixel unit, and the blue sub-pixel unit are arranged between the adjacent gate driving units in each row of the sub-pixel units.

4. The spliced display screen according to claim 1, wherein for each of the display panels, the pixel units are arranged in an array in the display area, and in one row of the pixel units, some of the pixel units comprise the gate driving units, some of the pixel units exclude the gate driving units, and the pixel units provided with the gate driving units are arranged adjacently.

5. The spliced display screen according to claim 1, wherein at a splicing joint of two neighboring ones of the display panels, a distance from a row of the pixel units in one display panel closest to the terminal area at the splicing joint to a row of the pixel units in the other display panel closest to the terminal area at the splicing joint ranges from 0.9 to 1.1 times a distance between each two adjacent pixel units in any of the two neighboring display panels.

6. The spliced display screen according to claim 1, wherein in each of the display panels, the data terminals and the scan terminals are disposed in a same row, and the scan terminals and the gate driving units are disposed on a same side of the data terminals.

7. The spliced display screen according to claim 1, wherein in each of the display panels, the data terminals and the scan terminals are disposed in different rows, and the scan terminals are disposed on one side of the data terminals away from the pixel units.

8. A spliced display device, comprising the spliced display screen, the spliced display screen comprising at least two spliced display panels, wherein each of the display panels comprises a terminal area and a display area, the terminal area is disposed on one side of the display area, the display area comprises a plurality of pixel units, and the pixel units comprises a plurality of sub-pixel units and a plurality of gate driving units, wherein the gate driving units are located within the display area;

wherein the terminal area comprises a plurality of data terminals and a plurality of scan terminals, the data terminals are connected to the sub-pixel units, the scan terminals are connected to the gate driving units, the data terminals and the scan terminals are disposed on a same, single side of the display area, and the terminal area of one of the display panels is arranged corresponding to the display area of another one of the display panels, for each of the display panels, the pixel units are arranged in an array in the display area, and in each row of the pixel units, the sub-pixel units are disposed between the adjacent gate driving units within each two neighboring pixel units, wherein for each of the display panels, the gate driving units are arranged in a plurality of columns in a column direction of the array of the pixel units, and each column of the gate driving units are arranged at intervals alongside a column of the sub-pixel units within a column of the pixel units, wherein each of the gate driving units is fully integrated within one of the pixel units, the gate driving units comprise a plurality of pull-up control units, a plurality of first pull-down maintaining units, a plurality of second pull-down maintaining units, a plurality of pull-up units, and a plurality of pull-down units; and the pull-up control units, the first pull-down maintaining units, the second pull-down maintaining units, the pull-up units, and the pull-down units are respectively arranged in the pixel units in each row, and wherein for each of the display panels, in each two neighboring pixel units in a column of the pixel units, adjacent gate driving units are disposed on a same side of the sub-pixel units.

9. The spliced display device according to claim 8, wherein for each of the display panels, in each two neighboring pixel units in each column of the pixel units, adjacent gate driving units are disposed on a same side of the sub-pixel units.

10. The spliced display device according to claim 8, wherein each of the sub-pixel units comprises a red sub-pixel unit, a green sub-pixel unit, and a blue sub-pixel unit, and wherein the red sub-pixel unit, the green sub-pixel unit, and the blue sub-pixel unit are arranged between the adjacent gate driving units in each row of the sub-pixel units.

11. The spliced display device according to claim 8, wherein for each of the display panels, the pixel units are arranged in an array in the display area, and in one row of the pixel units, some of the pixel units comprise the gate driving units, some of the pixel units exclude the gate driving units, and the pixel units provided with the gate driving units are arranged adjacently.

12. The spliced display device according to claim 8, wherein at a splicing joint of two neighboring ones of the display panels, a distance from a row of the pixel units in one display panel closest to the terminal area at the splicing joint to a row of the pixel units in the other display panel closest to the terminal area at the splicing joint ranges from 0.9 to 1.1 times a distance between each two adjacent pixel units in any of the two neighboring display panels.

13. The spliced display device according to claim 8, wherein in each of the display panels, the data terminals and the scan terminals are disposed in a same row, and the scan terminals and the gate driving units are disposed on a same side of the data terminals.

14. The spliced display screen according to claim 8, wherein in each of the display panels, the data terminals and the scan terminals are disposed in different rows, and the scan terminals are disposed on one side of the data terminals away from the pixel units.

* * * * *